US006161438A

United States Patent [19]

Mullet et al.

[11] Patent Number: 6,161,438

[45] Date of Patent: Dec. 19, 2000

[54] SYSTEM AND RELATED METHODS FOR DETECTING A FORCE PROFILE DEVIATION OF A GARAGE DOOR

[75] Inventors: Willis J. Mullet, Pensacola Beach; Yan Rodriguez, Pace, both of Fla.

[73] Assignee: Wayne-Dalton Corp., Mt. Hope, Ohio

[21] Appl. No.: 09/175,650

[22] Filed: Oct. 20, 1998

[51] Int. Cl.[7] .......... G01B 7/16

[52] U.S. Cl. .......... 73/774; 73/862.381

[58] Field of Search .......... 73/862.01, 862.381, 73/862.68, 760, 774; 49/139; 318/266

[56] References Cited

U.S. PATENT DOCUMENTS

| | | | |
|---|---|---|---|
| 3,210,067 | 10/1965 | Ferguson et al. | 268/65 |
| 3,247,615 | 4/1966 | Kalog | 49/30 |
| 3,470,653 | 10/1969 | Kalog | 49/139 |
| 3,608,612 | 9/1971 | Pemberton | 160/188 |
| 3,616,575 | 11/1971 | Harris | 49/200 |
| 3,728,605 | 4/1973 | Purtilo | 318/475 |
| 3,764,874 | 10/1973 | Geoffrey | 318/266 |
| 3,764,875 | 10/1973 | Harris | 318/266 |
| 3,792,644 | 2/1974 | Ferguson et al. | 91/420 |
| 3,813,590 | 5/1974 | Ellmore | 318/266 |
| 3,921,335 | 11/1975 | Hewitt et al. | 49/265 |
| 3,996,697 | 12/1976 | Bailey et al. | 49/28 |
| 4,001,969 | 1/1977 | Hoobery | 49/95 |
| 4,018,005 | 4/1977 | Harris | 49/199 |
| 4,231,191 | 11/1980 | Ellmore | 49/28 |
| 4,311,225 | 1/1982 | Tsubaki et al. | 192/142 |
| 4,408,146 | 10/1983 | Beckerman | 318/264 |
| 4,625,291 | 11/1986 | Hormann | 364/550 |
| 4,638,433 | 1/1987 | Schindler | 364/400 |
| 5,218,282 | 6/1993 | Duhame | 318/603 |
| 5,278,480 | 1/1994 | Murray | 318/626 |
| 5,419,010 | 5/1995 | Mullet | 16/198 |
| 5,770,934 | 6/1998 | Theile | 318/469 |
| 5,801,502 | 9/1998 | Monzen | 318/286 |

FOREIGN PATENT DOCUMENTS

| | | |
|---|---|---|
| 2323408 | 9/1998 | United Kingdom . |

*Primary Examiner*—Max Noori

*Attorney, Agent, or Firm*—Renner, Kenner, Greive, Bobak, Taylor & Weber

[57] ABSTRACT

An internal entrapment system (10) for a door (12) movable by a repeatable force includes a force generating device (68) for transferring the door (12) between a first and a second position. A trolley arm (34) connected between the force generating device (68) and the door (12) is continually strained during movement of the door (12). A sensor (50) mounted on the trolley arm (34) generates a signal (54) representative of the strain applied to the trolley arm (34). A processor (72) receives the strain signal (54) for comparison to a predetermined threshold, when the strain signal (54) exceeds the predetermined threshold, the processor (72) at least stops the force generating device (68). A potentiometer (74) is coupled to the door (12) for determining a plurality of positional locations of the door (12) between the first and the second positions, wherein the processor (72) correlates the position of the door (12) with the strain signal (54) for use in comparison to the predetermined threshold. A power supply (64) provides electrical power to the force generating device (68), the sensor (50), the processor (72), and the potentiometer (74), and a decoder/amplifier circuit (70), which also receives electrical power from the power supply (64) and receives the strain signal (54) for conversion into a format acceptable for use by the processor (72).

6 Claims, 2 Drawing Sheets

SYSTEM AND RELATED METHODS FOR DETECTING A FORCE PROFILE DEVIATION OF A GARAGE DOOR

TECHNICAL FIELD

Generally, the present invention relates to detecting and measuring the force and position of a door or any device that is directly connected to a driving source as the door travels between open and closed positions. More particularly, the present invention relates to an entrapment protection system which obtains and updates a force profile during each cycle of door travel. More specifically, the present invention relates to a system which employs a force sensor to obtain force data of an overhead door during each cycle and a mechanism to detect the position of the door, wherein the system compares force data at each position of the door to determine if an obstruction has been encountered.

BACKGROUND ART

As is well known, motorized door operators automatically open and close a garage door or the like through a path that is defined by a physical upper limit and a physical lower limit. The physical lower limit is established by the floor upon which the garage door closes. The physical upper limit can be defined by the highest point the door will travel, which can be limited by the operator, the counterbalance system, or the door track system's physical limits. The operator's upper and lower limits are employed to prevent door damage resulting from the operator's attempt to move a door past its physical limits. Under normal operating conditions, the operator's limits may be set to match the door's upper and lower physical limits. However, operator limits are normally set to a point less than the door's physical upper and lower limits.

One known limit system employs pulse counters that set the upper and lower travel of the door by counting the revolutions of an operator's rotating component. These pulse counters are normally coupled to the shaft of the motor and provide a count to a microprocessor. The upper and lower limits are programmed into the microprocessor by the consumer or installer. As the door cycles, the pulse counter updates the count to the microprocessor. Once the proper count is reached, which corresponds to the count of the upper and lower limits programmed by the consumer or installer, the door stops. Unfortunately, pulse counters cannot accurately keep count. External factors such as power transients, electrical motor noise, and radio interference often disrupt the count, allowing the door to over-travel or under-travel. The microprocessor may also lose count if power to the operator is lost or if the consumer manually moves the door while the power is off and the door is placed in a new position that does not match the original count.

Motorized garage door operators often include internal or primary entrapment protection systems designed to monitor door speed and applied force as the door travels in the opening and closing directions. During travel from the open-to-close and from the close-to-open positions, the door maintains a relatively constant speed. However, if the door encounters an obstacle during travel, the speed of the door slows down or stops, depending upon the amount of negative force applied by the obstacle. Systems for detecting such a change in door speed and applied force are commonly referred to as "internal entrapment protection" systems. Once the internal entrapment protection is activated, the door may stop or stop and reverse direction.

Most residential operator systems are closed loop systems, wherein the door is always driven by the operator in both the open-to-close and close-to-open directions. A closed loop system works well with the internal entrapment system, wherein the operator is always connected to the door and exerting a force on the door when the door is in motion unless it is disconnected manually by the consumer. If an obstacle is encountered by the door, the direct connection to the operator allows for feedback to the internal entrapment device, which signals the door to stop or stop and reverse. However, due to the inertia and speed of the door and the tolerances in the door and track system, these internal entrapment systems are very slow to respond, and some time passes after contacting an obstruction before the internal entrapment device is activated, thus allowing the door to over-travel and exert very high forces on an object that is entrapped. As such, known internal entrapment systems, by themselves do not work well, especially when the open/close cycle is remotely actuated. Some systems even incorporate timers that will cause the door to open if the bottom limit is not contacted within 30 seconds from the time the door started to close. In most instances, this length of time is much too long. Further, a closed loop operator system always has the capability of exerting a force greater that the weight of the door.

A known method of internal entrapment protection on a closed loop system uses a pair of springs to balance a lever in a center position and a pair of switches to indicate that the lever is off-center, thereby signaling that an obstruction has been encountered. The lever is coupled to a drive belt or chain and balanced by a pair of springs adjusted to counterbalance the tension on the belt or chain so the lever stays centered. When an obstruction is encountered, the tension on the belt or chain overcomes the tension applied by the springs, thus allowing the lever to shift off-center and contact a switch that generates an obstruction signal. Sensitivity of this system can be adjusted by applying more tension to the centering springs to force the lever to stay centered. This type of internal entrapment systems is slow to respond due to the inertia of the door, the stretch in the drive belt or chain, and the components of the drive system.

Another method of the prior art on closed loop operator internal entrapment systems uses an adjustable clutch mechanism. The clutch is mounted on a drive component and allows slippage of the drive force to occur if an obstruction prevents the door from moving. The amount of slippage can be adjusted in the clutch so that a small amount of resistance to the movement of the door causes the clutch to slip. However, due to aging of the door system and environmental conditions that can change the force required to move the door, these systems are normally adjusted to the highest force condition anticipated by the installer or the consumer. Further, over time the clutch plates can corrode and freeze together, preventing slippage if an obstruction is encountered.

In addition to using the aforementioned pulse counters to set the upper and lower limits of door travel, they may also be used to monitor the speed of the garage door. The optical encoders used for speed monitoring are normally coupled to the shaft of the motor. An interrupter wheel disrupts a path of light from a sender to a receiver. As the interrupter or chopper wheel rotates, the light path is reestablished. These light pulses are then sent to a microprocessor every time the beam is interrupted. Alternatively, magnetic flux sensors function the same except that the chopper wheel is made of a ferromagnetic material and the wheel is shaped much like a gear. When the gear teeth come in close proximity to the sensor, magnetic flux flows from the sender through a gear tooth and back to the receiver. As the wheel rotates, the air gap between the sensor and the wheel increases. Once this gap becomes fully opened, the magnetic flux does not flow to the receiver. As such, a pulse is generated every time magnetic flux is detected by the receiver. Since motor control circuits used for operators do not have automatic speed compensation, the speed is directly proportional to the load. Therefore, the heavier the load, the slower the rotation of the motor. The optical or magnetic encoder counts the number of pulses in a predetermined amount of time. If the motor slows down, the count is less than if the motor had moved at its normal speed. Accordingly, the internal entrapment device triggers as soon as the number of pulses counted falls below a manually set threshold during the predetermined period of time.

From the foregoing discussion it will be appreciated that as a residential garage door travels in the opening and closing directions, the force needed to move the door varies depending upon the door position or how much of the door is in the vertical position. Counterbalance springs are designed to keep the door balanced at all times if the panels or sections of the door are uniform in size and weight. The speed of the door panels as they traverse the transition from horizontal to vertical and from vertical to horizontal can cause variations in the force requirement to move the door. Further, the panels or sections can vary in size and weight by using different height panels together or adding windows or reinforcing members to the panels or sections. In prior-art devices, these variations cannot be compensated for.

To compensate for these variations, a force setting must be employed to overcome the highest force experienced to move the door throughout the distance the door travels. For example, the force to move a door could be as low as 5 to 10 pounds at the initiation of the movement and increase to 35 to 40 pounds at another part of the movement. Therefore, the force setting on the operator must be least 41 pounds to assure the internal entrapment device will not activate. If an obstacle is encountered during the time the door is in the 35 to 40 pound range, it will take only 1 to 6 pounds of force against the object to activate the internal entrapment device. However, if the door is in the 5 to 10 pound range, the door will require up to 31 to 36 pounds of force against the object before the internal entrapment device activates. To exacerbate this condition, the force adjustments on these internal entrapment devices are set by the consumer or the installer to allow the operator to exert several hundred pounds of force before the internal entrapment device will activate. As such, it is common to find garage door operators that can crush automobile hoods and buckle garage door panels before the internal entrapment system is triggered.

Two patents have attempted to address the shortcomings of properly triggering internal entrapment systems. One such patent, U.S. Pat. No. 5,278,480, teaches a microprocessor system that learns the open and closed position limits as well as force sensitivity limits for up and down operation of the door. This patent also discloses that the closed position limit and the sensitivity limits are adaptably adjusted to accommodate changes in conditions to the garage door. Further, this system may "map" motor speed and store this map after each successful closing operation. This map is then compared to the next closing operation so that any variations in the closing speed indicate that an obstruction is present. Although this patent is an improvement over the aforementioned entrapment systems, several drawbacks are apparent. First, the positional location of the door is provided by counting the rotations of the motor with an optical encoder. As discussed previously, optical encoders and magnetic flux pickup sensors are susceptible to interference and the like. This system also requires that a sensitivity setting must be adjusted according to the load applied. As noted previously, out-of-balance conditions may not be fully considered in systems with an encoder. Although each open/close cycle is updated with a sensitivity value, the sensitivity adjustment is set to the lowest motor speed recorded in the previous cycle. Nor does the disclosed system consider an out-of-balance condition or contemplate that different speeds may be encountered at different positional locations of the door during its travel.

Another patent, U.S. Pat. No. 5,218,282, also provides an obstruction detector for stopping the motor when the detected motor speed indicates a motor torque greater than the selected closing torque limit while closing the door. The disclosure also provides for at least stopping the motor when the detected motor speed indicates that motor torque is greater than the selected opening torque limit while opening the door. This disclosure relies on optical counters to detect door position and motor speed during operation of the door. As discussed previously, the positional location of the door cannot be reliably and accurately determined by pulse counter methods.

Co-pending U.S. patent application, U.S. Ser. No. 08/906,529, which is owned by the Assignee of the present application and which is incorporated herein by reference, provides for an internal entrapment system. The disclosure provides a potentiometer coupled to the door to determine its position and a pulse counter that determines an amount of force or motor torque used to open and close the door. Although effective, this system optimally requires temperature sensors to accommodate any impact that temperature changes may have on the motor and pulse-counting sequence.

Another type of system connected to a door is a trolley-type garage door operator that applies an operating force to the garage door. As with the other types of garage door opening systems, the trolley-type operator employs a direct connection of the motorized unit to the door. Unfortunately, the trolley-type operator is not sensitive enough to provide adequate entrapment protection in that the operator is slow to respond when an obstruction is encountered, and secondary entrapment protection is required to achieve adequate protection. Based on the foregoing discussion of internal entrapment system, it will be appreciated that there is a great need for a backup or secondary entrapment system. The secondary or external entrapment system is required in the event the internal or primary entrapment system fails or is slow to respond. Common secondary entrapment systems employ photo cells or edge sensors. These devices may have dead spots in areas that need detection beyond the range of individual sensors. This can be corrected by adding additional sensors to cover the dead spot, but this adds to the cost of the protection system and to the cost of installation. Additionally, these types of sensors require alignment to work properly and can become misaligned during use. These sensors are also affected by moisture and dust on their lenses, preventing proper operation. Some of these devices are pressure-sensitive switches that are mounted on the door or the edges of the opening and will generate a signal if compressed, indicating an obstruction is present between the door and the opening. These switches must extend through or along the perimeter of the opening and will increase in cost proportional to the size of the opening. Further, the materials used to manufacture these devices can vary in hardness with the environmental temperatures changing, creating less sensitive detection in cold weather and sometimes too sensitive in hot weather.

Doors that are directly connected to the motorized unit, such as a garage door and a garage door operator, are not precise units due to the slack in the mechanical drive train and the methods of attaching to the door. Moreover, the guide rails and the mountings can deflect when an obstruction is encountered, delaying or preventing standard sensors from indicating an obstruction. It has been determined that conventional methods of determining the door's operating parameters are too vague to provide adequate entrapment protection without the use of external (or secondary) devices, such as photo cells and edge sensors.

Photo cells require wiring sized to the opening to transmit the signal back to the motor controls or a wireless device that requires a battery. The edge sensors that are attached to the door also require wiring that must be commutated from the movable closure to the motor control. Alternatively, a wireless transmitter may be used. Edge sensors that are attached to the opening must also have provisions to send signals to the motor controls. As will be appreciated, this extensive wiring adds to the cost of installation and is susceptible to damage.

DISCLOSURE OF INVENTION

Therefore, an object of the present invention is to provide an entrapment system to monitor door position and applied force as the door travels in the opening and closing directions, wherein if the door encounters an obstacle during opening and closing, the applied force at a particular door position will change. A further object of the present invention is to provide entrapment protection by knowing the amount of force required to move an object, such as a door, through a specific amount of distance or time. Another object of the present invention is to stop and reverse or just stop travel of the door if predetermined thresholds of applied force and corresponding positions are not met. Still another object of the present invention is to generate door profile data during an initial door open and close cycle and whereupon the door profile data and predetermined thresholds are updated after each cycle.

Another object of the present invention is to provide an entrapment system with a processor control system that monitors input from a potentiometer coupled to the door to determine its position and a strain gauge to determine force applied to the door as it travels. A further object of the present invention is to provide a processor control system that generates door profile information based upon various inputs and stores this data in nonvolatile memory. Yet another object of the present invention is to provide a setup button connected to the processor control system to allow for an initial generation of door profile data, wherein the processor reads the door position and the force applied to the door at a plurality of door positions in both opening and closing directions.

Another object of the present invention is to provide an entrapment system in which a processor control system reads door profile information during each cycle of the door position and compares the new information with the previously stored information and wherein if the new force profile varies from the stored force profile by a predetermined amount, travel of the door is stopped and/or reversed.

Another object of the present invention is to provide an entrapment system with a potentiometer that is coupled to the door to determine the exact position of the door. A further object of the present invention is to provide a potentiometer that is coupled to the door to output a voltage value relative to the position of the door.

Another object of the present invention is to provide an entrapment system for a door controlled by a door operator, including a motor for transferring the garage door between first and second positions, means for determining a force applied to the door between first and second positions, means for determining a plurality of positional locations of the door during transfer between first and second positions, and controller means for correlating the force determination for each plurality of positional locations to generate a plurality of door profile data points, wherein the controller means takes corrective action by controlling the operation of the motor if the force determination for any one of the plurality of positional locations goes beyond a predetermined force threshold for a respective positional location in the plurality of door profile data points, otherwise, the controller means updates the plurality of door profile data points to the force determinations for each respective positional location of the plurality of positional locations.

Another object of the present invention is to provide a system for determining whether an obstruction is in the path of a motor-driven door, including a motor, a trolley, a trolley arm slidably movable in relation to the trolley and pivotably mountable at least with respect to the door, the trolley arm being coupled to the motor to move the door between open and closed positions, means for determining a force applied to the door as the door moves between open and closed positions at predetermined locations to generate a force profile, the determining means being coupled to the trolley arm, and means for comparing the force profile to a threshold force profile, wherein the motor is at least stopped if the force profile is beyond the threshold force profile.

In general, the present invention contemplates an entrapment system for a door movable by a repeatable force, including a force generating device for transferring the door between a first and a second position, a trolley arm connected between the force generating device and the door, the trolley arm being continually strained during movement of the door, a sensor mounted on the trolley arm and generating a signal representative of the strain applied to the trolley arm, and a processor for receiving the strain signal for comparison to a predetermined threshold, wherein if the strain signal exceeds the predetermined threshold, the processor at least stops the force generating device.

BEST MODE FOR CARRYING OUT THE INVENTION

Figure 1:
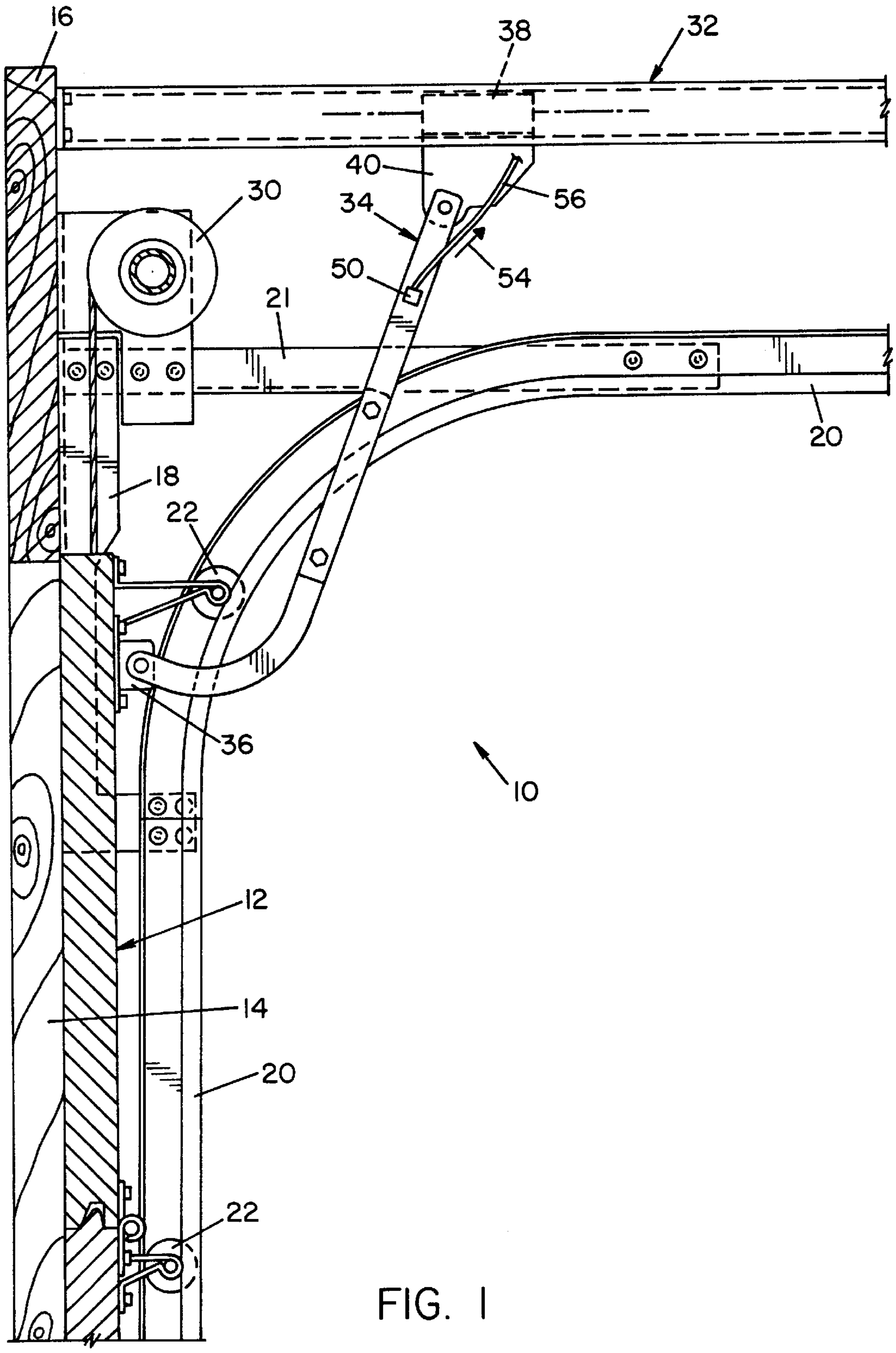
FIG. 1 is a fragmentary schematic side view of a trolley-type operating system associated with a sectional garage door having an internal entrapment system embodying the concepts of the present invention.
Figure 2:
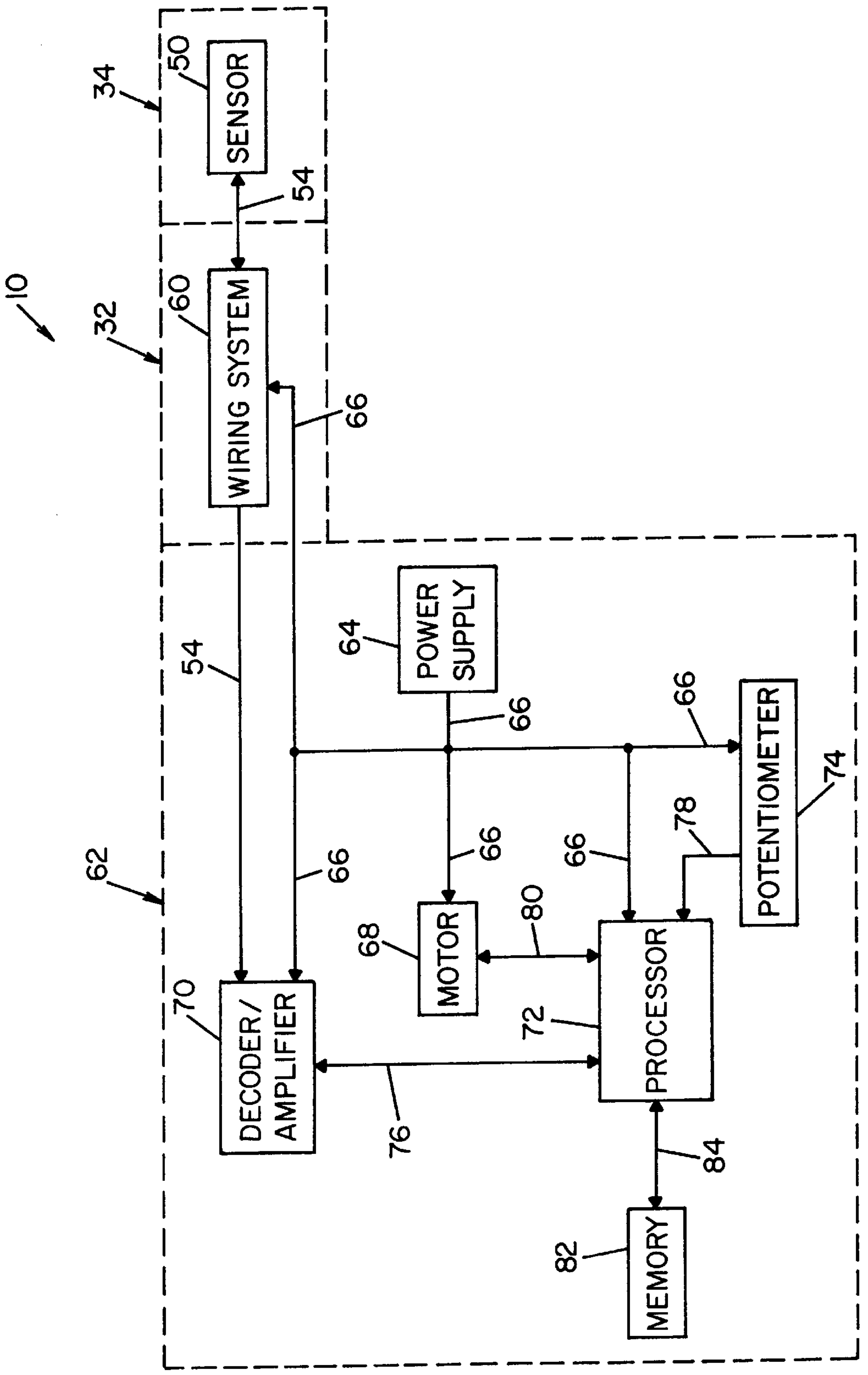
FIG. 2 is a schematic view of the control circuit of the operator mechanism employed in the internal entrapment system.

A system and related methods for detecting a force profile deviation of a garage door is generally indicated by the numeral 10 in FIGS. 1 and 2. As best seen in FIG. 1, the system 10 is employed in conjunction with a conventional sectional garage door, generally indicated by the numeral 12. The present invention may also be employed for use with gates, windows, or other closures directly connected to a driving source such as a motorized operator. The opening in which the door 12 is positioned for opening and closing movements relative thereto is surrounded by a pair of vertically spaced jamb members 14, which are generally parallel and extend vertically upwardly from the ground (only one jamb member is shown). Jambs 14 are spaced apart and joined at their vertical upper extremity by a header 16 to thereby form a generally unshaped frame around the opening of the door 12. The jamb members 14 and headers 16 are normally constructed of lumber or other structural building materials for the purpose of reinforcement and to facilitate the attachment of elements supporting and controlling the door 12.

Secured to the jambs 14 are L-shaped vertical members 18. A track 20 is secured to each respective vertical member 18 along the vertical length of the track 20. A brace 21 is cantilevered from the top end of the vertical member 18 to support the portion of the track 20 that extends horizontally. The horizontal portion of the track 20 may also be carried or suspended by braces extending from the ceiling. Each track 20 is aligned with the side of the door 12 and extends substantially vertically with the length of the jamb member 14 and then extends substantially horizontally from the upper end of the door 12 in the closed position depicted in FIG. 1. Each track 20 receives a roller 22 that extends from the top edge of the garage door 12. Additional rollers 22 may also be provided at each top vertical edge of each section of the garage door 12 to facilitate transfer between the open and the closed positions.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. Generally, the counterbalancing system 30 is affixed to the header 16 near its ends and at about a midpoint thereof.

A trolley 32 is attached to or suspended from the ceiling and is positioned at about a midpoint between the tracks 20. A trolley arm 34 interconnects the garage door 12 to the trolley 32. In particular, a door plate 36 extends from a top section of the door 12. One end of the trolley arm 34 is pivotably mounted to the door plate 36. A plate 38 is slidably received in the trolley 32 and a slide bracket 40 extends substantially downwardly from the slide plate 38. The end of the trolley arm 34 opposite door plate 36 is pivotably mounted to the slide bracket 40. The slide plate 38 is mechanically driven by a chain, screw drive, or the like to push/pull the garage door between a closed position and an open position. This travel or movement is assisted by the counterbalancing system 30.

A sensor 50, which in the preferred embodiment may be a strain gage or a piezoelectric transducer, is mounted upon the trolley arm 34. When opening or closing forces are applied to the door 12, the sensor 50 generates a strain signal 54 that is transferred, as by a wire 56 along the trolley 32, to circuitry for analysis.

As best seen in FIG. 2, the strain signal 54 generated by the sensor 50 is received by a wiring system 60 carried by the trolley 32. The wiring system 60 conducts the strain signal 54 to an operator 62. The operator 62 includes a power supply 64 which provides regulated power to various components of the operator 62. In particular, the power supply 64 generates power signals 66 that are received by a motor 68, a decoder/amplifier 70, a processor 72, and a potentiometer 74. Of course, other electrically-powered components of the operator 62, such as set-up buttons, remote control actuators, and the like, may be contained within the operator 62 and receive power from the power supply 64.

The decoder/amplifier 70 receives the strain signal 54 for further processing. In particular, the sensor 50 is a full bridge sensor. As the door 12 opens and closes, a strain is imparted to the trolley arm 34. This strain or force changes the resistance of one of the legs of the bridge sensor 54 and, accordingly, creates a measurable imbalance. This imbalance changes a voltage present in the sensor 50, which in turn changes a frequency output of the sensor 54. In the preferred embodiment, the sensor 50 is powered by a 4-to-20 ma current loop. This frequency output travels through the wiring system 60 and is received by the decoder/amplifier 70. Along with other processing functions, the decoder/amplifier 70 converts the frequency output received into a voltage value. The voltage value is then transmitted to the processor 72, where an analog-to-digital convertor transforms the signal into a readable digital format. As those skilled in the art will appreciate, the processor 72 includes the necessary hardware, software, and memory functions to coordinate the operation of the operator 62 and, of course, the opening and closing of the garage door 12.

The potentiometer 74 generates a potentiometer signal 78 for the purpose of determining positional location of the door 12. In the preferred embodiment, the potentiometer 74 is coupled to the motor 68 to correlate the position of its driving shaft to the location of the door 12. Alternatively, the potentiometer 74 may be coupled to the door 12 itself. As those skilled in the art will appreciate, the potentiometer 74 provides a slidable member coupled to the moving item (the door, the motor shaft or the like), which generates a specific voltage value for each position. The slidable member controls the voltage output by a voltage divider. Although it is preferred to use a potentiometer to determine door position locations, other devices such as a timer or counter may be used. Use of either a timer or counter necessitates that a setup routine as discussed below, be used if the driving motor is ever re-positioned to the door.

The motor 68 communicates with the processor 72 via a motor signal 80 to provide necessary operating information in regard to the motor 68 and also to instruct the motor 68 to stop when an obstruction is detected. The processor 72 may also instruct the motor 68 to reverse direction when an obstacle or obstruction is detected. The motor 68 provides the necessary driving force to move the door 12 between positions at a predetermined speed.

Generally, the internal entrapment system embodied in the operator 62 utilizes door profile data acquired during a set-up or installation routine to determine the appropriate force limits for when the door 12 is opening and for when the door 12 is closing. Door profile data is saved in nonvolatile memory 82 and communicated with the processor 72 via a memory signal 84. New door profile data is saved in the nonvolatile memory 82 every time the door 12 is cycled. The door profile data contains door position and force applied to the door 12 for a plurality of points during the operation cycle. The potentiometer 74 is employed to detect door position throughout the operation cycle while the sensor 50 is employed to provide force values at predetermined door positions during the opening and closing cycles. A strain or force value of the trolley arm 34 is loaded into the memory 82 during the initial set-up routine, and as such, no user controls are needed to set the force limits. Once the set-up routine is complete, the internal entrapment system triggers whenever the force applied and detected by the sensor 50 exceeds a predetermined threshold for each monitored door position throughout the operation cycle. It will be appreciated that different threshold settings are possible by reprogramming the processor 72.

During normal door operation, the user either actuates an open/close button or a remote open/close button to begin an opening or a closing cycle. At this time, the processor 72 reads and processes the force detected by the sensor 50 and the positional location of the door 12 provided by the potentiometer 74. The processor 72 compares this data with the door profile data stored in memory 82. If the force profile detected is within the predetermined ranges of forces stored in memory 82 during the entire opening and closing cycle, the processor 72 stores the new profile data into the memory 82. This allows for gradual wear in the mechanical components without triggering the entrapment system. If, however, the detected strain for a positional location exceeds a predetermined range established by the stored door profile data, such as when a force obstructs the movement of the door 12, the processor 72 instructs the motor 68 to stop and, in some cases, may instruct the motor 68 to reverse its direction.

Based upon the foregoing description, it will be appreciated that the internal entrapment system provided by the present invention has numerous advantages over the prior art. In particular, the sensor 50 does not require additional area for the device nor does it require excessive associated equipment to be connected to the door 12. The sensor 50 provides instantaneous feedback to the motor controls whenever an obstruction is encountered. This, of course, provides a very important safety benefit. Another advantage of the present invention is that minimal wiring and installation time is required for the system. Still yet another advantage of the present invention is that it is not affected by environmental conditions or temperatures and requires no adjustment or service. Yet another advantage of the present invention is that force determinations can be made for each and every incremental position of the door 12. As such, no dead spots or areas that cannot detect an obstruction are able to undermine the entrapment system. Still yet another advantage of the present invention is that there is no need to know where the upper and lower limits are, unless there is a need to disregard input from the sensor 50. For example, if the force level increases due to the door reaching a physical limit and the force is the same and occurs at the same position at the same time as the previous cycle, the system 10 will not trigger a fault.

Thus, it should be evident that the system 10 and related methods for detecting and measuring the operational parameters of a garage door 10 disclosed herein carries out the various objects of the present invention set forth above and otherwise constitutes an advantageous contribution to the art. As will be apparent to persons skilled in the art, modifications can be made to the preferred embodiments disclosed herein without departing from the spirit of the intention. For example, it will be appreciated that the potentiometer 74 may be used solely to determine the positional location of the door. Moreover, the sensor 50 may be used to evaluate operation of the motor 68. Therefore, the scope of the invention herein described shall be limited solely by the scope of the attached claims.

What is claimed is:

1. A system for determining whether an obstruction is in the path of a motor-driven door, comprising:

a motor;

a trolley;

a trolley arm slidably movable in relation to said trolley and pivotably mountable at least with respect to the door, said trolley arm coupled to said motor to move the door between open and closed positions;

a force sensor coupled to said trolley arm, said sensor determining the amount of force applied to the door from a source other than directly from said motor as the door moves between open and closed positions at predetermined locations to generate a threshold force profile; and means for comparing said force profile to a threshold force profile, wherein said motor is at least stopped if any determined force is outside a range established by said threshold force profile.

2. The system according to claim 1, further comprising:

a potentiometer coupled directly to the door to establish the predetermined locations.

3. The system according to claim 2, wherein said force sensor is a strain gauge.

4. The system according to claim 2, wherein said force sensor is a piezoelectric transducer.

5. An entrapment system for a door movable by a repeatable force, comprising:

a force generating device for transferring the door between a first and a second position;

a trolley arm connected between said force generating device and the door, said trolley arm being continually strained during movement of the door;

a sensor mounted on said trolley arm and generating a signal representative of the strain applied to said trolley arm;

a processor for receiving said strain signal for comparison to a predetermined threshold, wherein if said strain signal exceeds said predetermined threshold, said processor at least stops said force generating device;

position means coupled to the door for determining a plurality of positional locations of the door between said first and said second positions, wherein said processor correlates the position of the door with said strain signal for use in comparison to said predetermined threshold;

a power supply for providing electrical power to said force generating device, said sensor, said processor, and said position means; and a decoder/amplifier circuit, which also receives electrical power from said power supply, receiving said strain signal for conversion into a format acceptable for said processor, wherein said predetermined threshold comprises a range of strain forces for each said positional location, said processor determining a strain force for each positional location as the door moves from a first position to a second position or vice versa, said processor determining whether said strain force for each positional location is less or greater than said range of strain forces for said positional location, if so, said processor instructs said force generating device to at least stop.

6. The system according to claim 5, wherein if said strain force for each positional location is within said range of strain forces for said positional location for an entire cycle of door transfer from said first to said second position or vice versa, said processor updates said range of strain forces for each said positional location from said strain force most recently determined.

* * * * *